United States Patent
Ruybal

(10) Patent No.: US 10,773,710 B2
(45) Date of Patent: Sep. 15, 2020

(54) SYSTEMS AND METHODS FOR A HYBRID VEHICLE WITH A MANUAL SHIFT TRANSMISSION

(71) Applicant: Ford Global Technologies, LLC, Dearborn, MI (US)

(72) Inventor: Kevin Ruybal, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 212 days.

(21) Appl. No.: 15/975,124

(22) Filed: May 9, 2018

(65) Prior Publication Data
US 2019/0344780 A1 Nov. 14, 2019

(51) Int. Cl.
*B60W 20/20* (2016.01)
*B60W 20/30* (2016.01)
*B60W 20/13* (2016.01)
*B60W 20/19* (2016.01)

(52) U.S. Cl.
CPC ............ *B60W 20/20* (2013.01); *B60W 20/13* (2016.01); *B60W 20/19* (2016.01); *B60W 20/30* (2013.01); *B60W 2540/14* (2013.01); *B60W 2710/028* (2013.01)

(58) Field of Classification Search
CPC .......................... B60W 20/20; B60W 2540/14
See application file for complete search history.

(56) References Cited

U.S. PATENT DOCUMENTS

| | | | |
|---|---|---|---|
| 2009/0022731 A1 | 1/2009 | von Schack et al. | |
| 2012/0022731 A1 | 1/2012 | Kuang et al. | |
| 2012/0065851 A1* | 3/2012 | Ellis, III | B60W 10/06 701/54 |
| 2013/0173126 A1* | 7/2013 | Ruebsam | B60W 10/02 701/67 |
| 2014/0114513 A1 | 4/2014 | Treharne et al. | |
| 2017/0101098 A1* | 4/2017 | Gibson | B60W 10/02 |
| 2018/0229727 A1* | 8/2018 | Kelly | F16H 61/0403 |
| 2019/0367009 A1* | 12/2019 | Pettersson | B60W 30/19 |

FOREIGN PATENT DOCUMENTS

GB     2498785 A     7/2013

* cited by examiner

*Primary Examiner* — Tisha D Lewis
(74) *Attorney, Agent, or Firm* — David Kelley; McCoy Russell LLP

(57) ABSTRACT

Systems and methods for operating a vehicle that includes a manual transmission are presented. In one example, a controller enters and exits a vehicle drive mode that is included in a plurality of vehicle drive modes in response to a clutch pedal being applied or released by a human vehicle operator. The vehicle drive modes include series hybrid, parallel hybrid, and electric vehicle only mode.

18 Claims, 8 Drawing Sheets

SYSTEMS AND METHODS FOR A HYBRID VEHICLE WITH A MANUAL SHIFT TRANSMISSION

FIELD

The present description relates to systems and methods for operating a hybrid vehicle with a manual shift transmission that may be selectively coupled to an engine. The methods and system may be particularly useful for changing between powertrain operating modes.

BACKGROUND AND SUMMARY

Hybrid vehicles may include a single ratio gear box or a step ratio automatic transmission. A controller of the hybrid vehicle typically selects a gear of the automatic transmission that is engaged and adjusts output of powertrain torque sources (e.g., internal combustion engine and/or electric machine) to improve vehicle efficiency. However, some human drivers prefer manual transmissions because manual transmissions allow the driver to have control over transmission gear shifting. To shift the manual transmission the driver depresses a clutch pedal and adjusts a position of a manual shift lever while the clutch pedal is depressed (e.g., applied). The clutch pedal opens a single clutch that disconnects an input shaft of the transmission from an engine crankshaft. Once the clutch is open, the driver may change a position of a shift lever to engage one of the transmission's gears. Once the gear is engaged, the clutch may be released to mechanically couple the engine's crankshaft to the vehicle's wheels. However, incorporating a manual transmission into a hybrid vehicle presents challenges. In particular, because the human driver is responsible for gear shifting, a gear shift may occur at nearly any time. A gear shift may disturb flow of power through the vehicle's powertrain and make it difficult or impracticable to carry on operation in a particular hybrid powertrain operating mode (e.g., series hybrid mode, parallel hybrid mode, electric vehicle only mode). Therefore, it may be desirable to provide a way of smoothly operating a hybrid vehicle that includes a manual transmission.

The inventor herein has recognized the above-mentioned disadvantages and has developed a method for operating a vehicle, comprising: operating a powertrain in an electric vehicle only drive mode; and starting combustion in an engine and adjusting engine rotational speed to a rotational speed of a transmission input shaft to exit the electric vehicle only drive mode in response to a human driver manually disengaging a clutch via a clutch pedal.

By starting an internal combustion engine and accelerating the engine to an input speed of a transmission input shaft, it may be possible to smoothly exit an electric vehicle only powertrain mode and enter a series or parallel hybrid powertrain operating mode. In particular, when the human driver depresses or applies a clutch pedal of a manual transmission while the vehicle is operating in an electric vehicle only hybrid powertrain operating mode, the internal combustion engine may be started (e.g., combusting fuel) so that engine torque may be available when the human driver releases the clutch pedal. If the human driver leaves the clutch pedal depressed while the engine is combusting fuel, then a battery may be charged to provide useful work from the engine. However, if the human driver released the clutch pedal and increases a driver demand torque, the engine power may be delivered to the vehicle's wheels. In this way, the human driver's operation of the clutch may be one of several conditions taken into consideration for switching between vehicle powertrain operating modes.

The present description may provide several advantages. In particular, the approach may allow a human driver to connect with a vehicle and provide smooth transitions between powertrain operating modes. Further, the approach may improve a human driver's confidence level when shifting a manual transmission. Additionally, the approach allows a human driver to change vehicle powertrain operating modes via a manual shift lever and operation of a clutch pedal.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating a hybrid vehicle that includes an internal combustion engine, an electric machine for vehicle propulsion, and a manual transmission. A human driver may wish to exert control over manual transmission gear shifting when an internal combustion engine is operating. Further, the human driver may wish to assert control over when the hybrid vehicle enters and exits electric vehicle only operating mode to improve the vehicle's fuel efficiency and sporty feel. The system and methods described herein accommodates such wishes while providing smooth powertrain mode changes.

Figure 1:
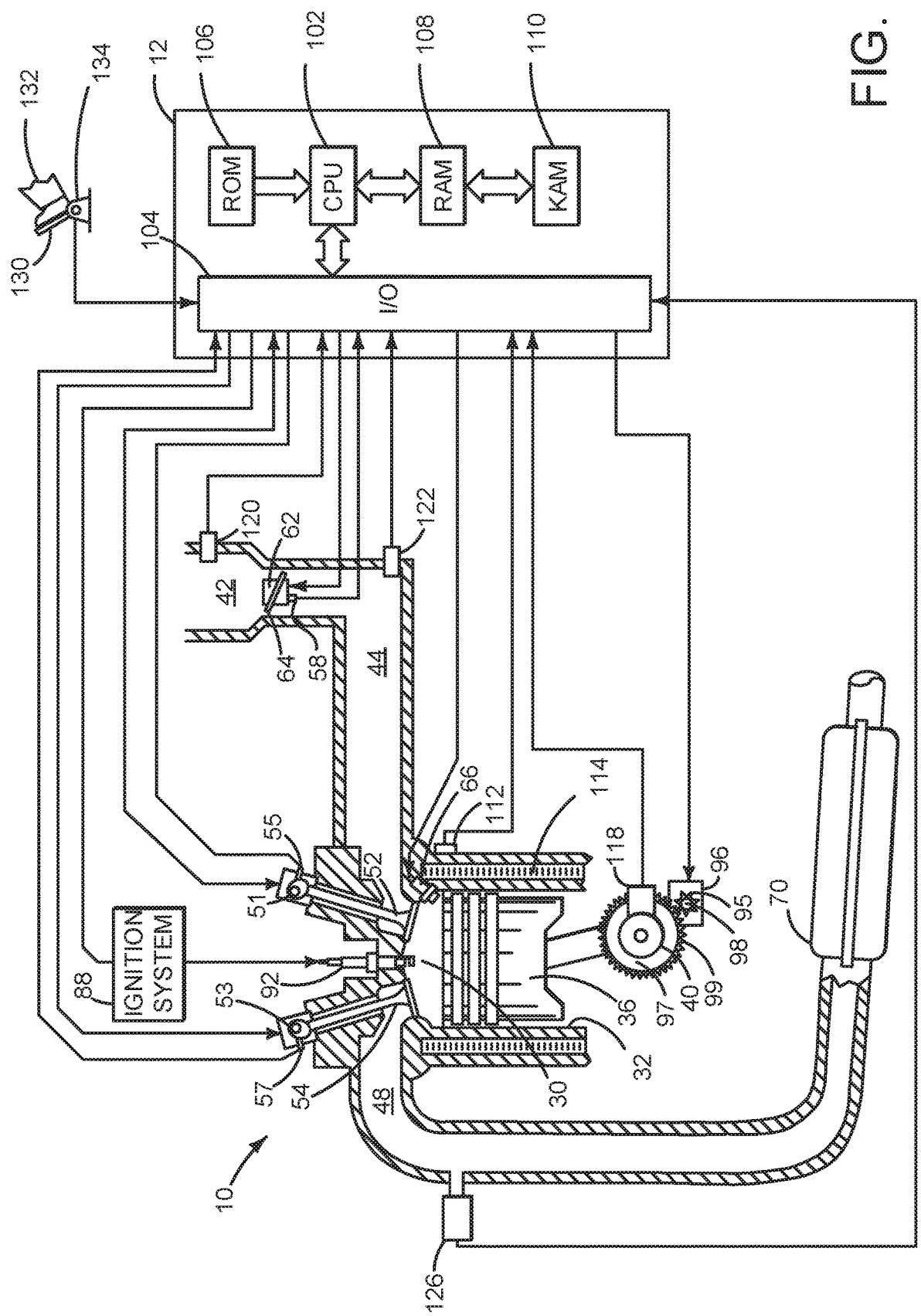
FIG. 1 is a schematic diagram of an engine.
Figure 2A:
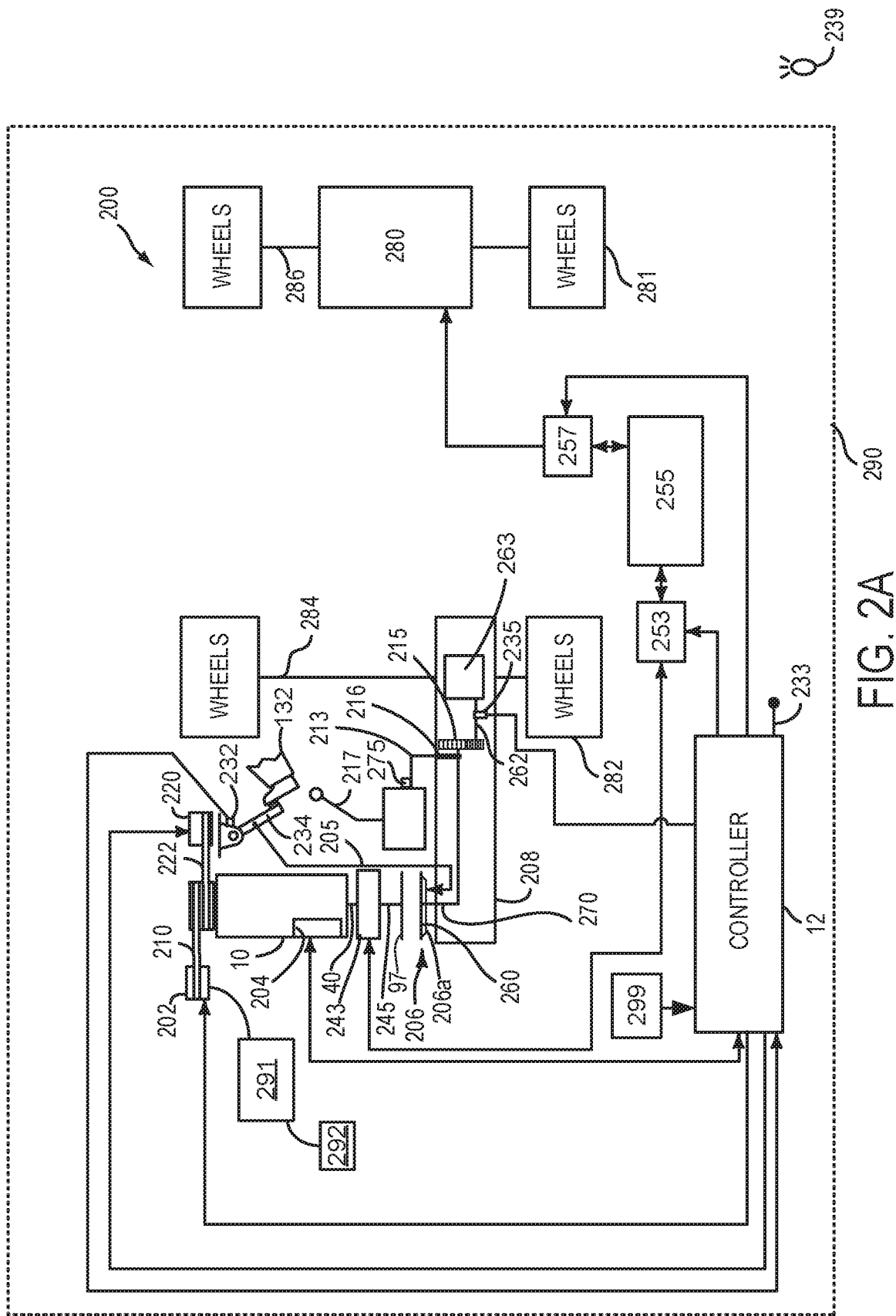
FIGS. 2A and 2B are example vehicle powertrain configurations.
Figure 2B:
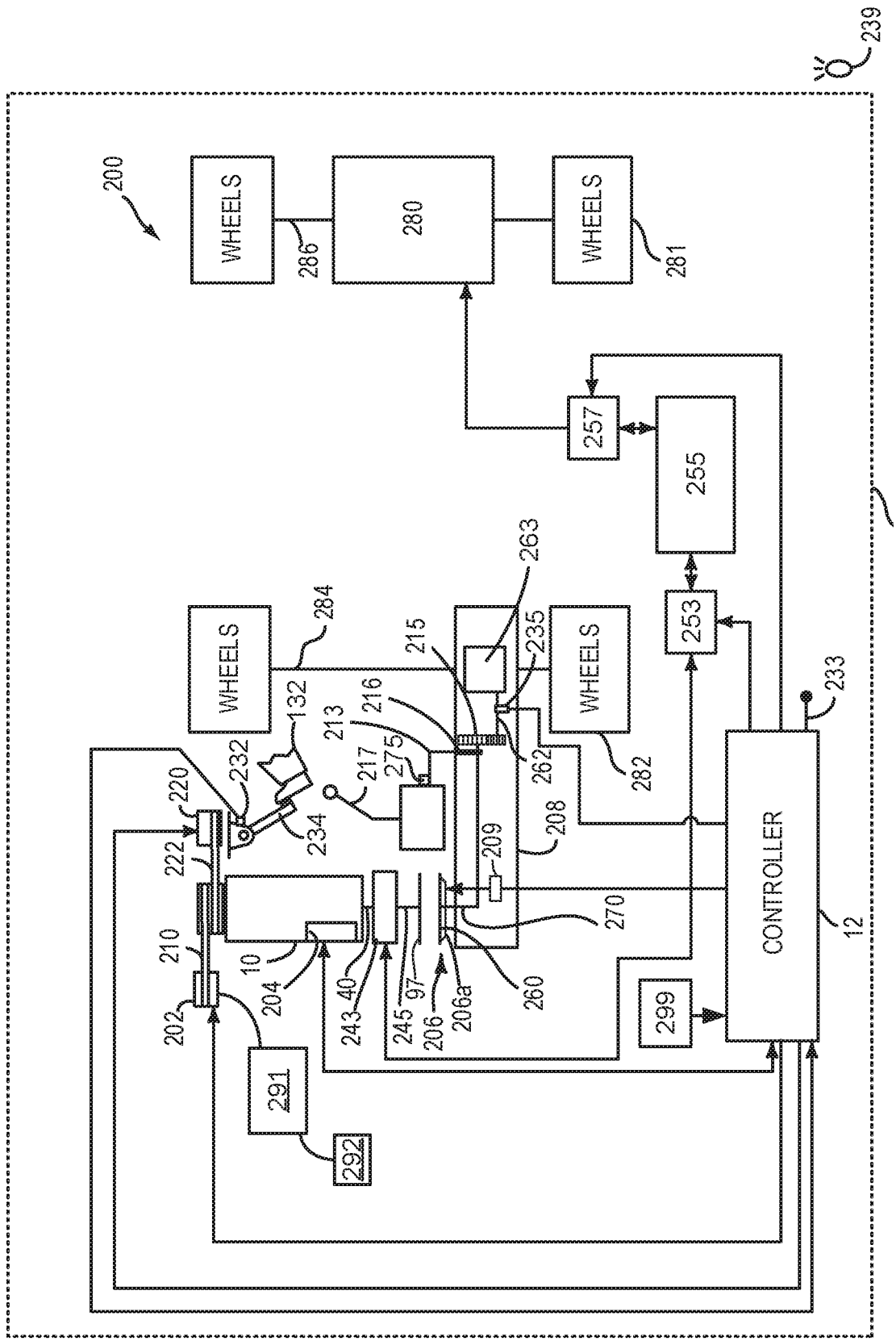
Figure 3:
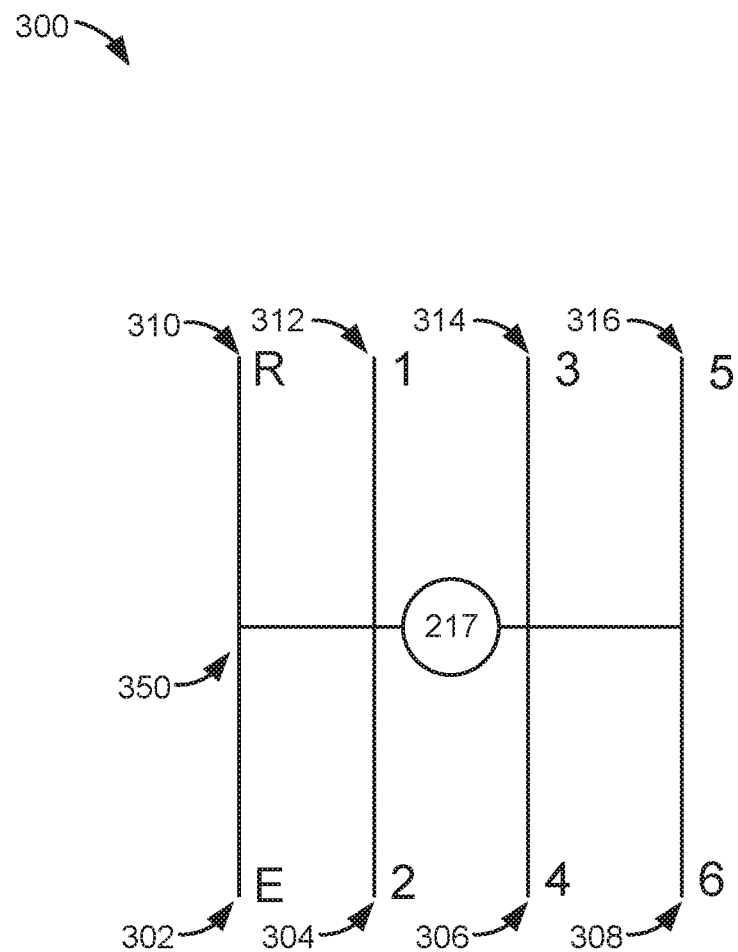
FIG. 3 shows an example shift lever and gear shifter gear slots.
Figure 4:
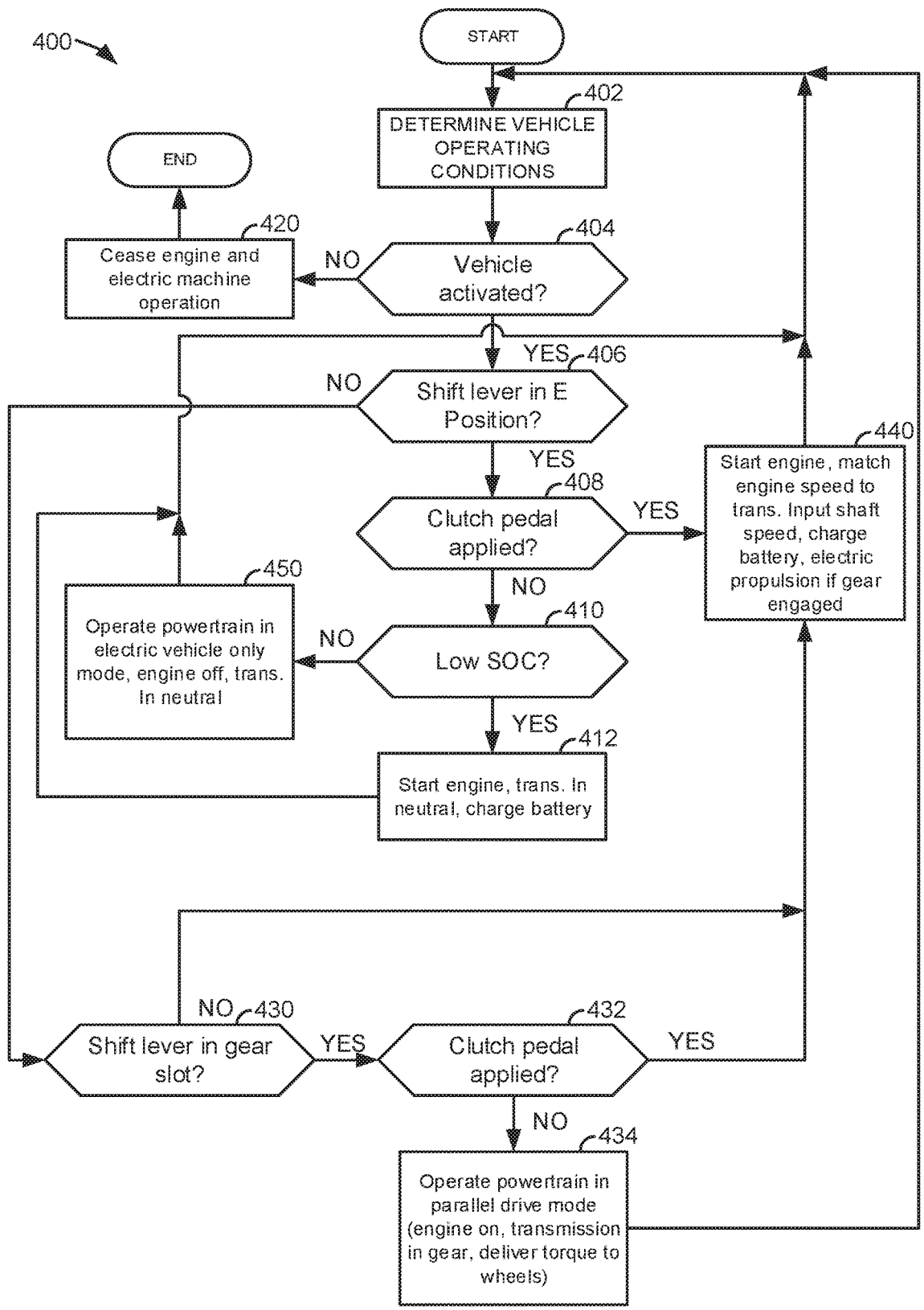
FIG. 4 shows a flow chart of a method for operating a hybrid vehicle that includes a manual transmission is shown.
Figure 5:
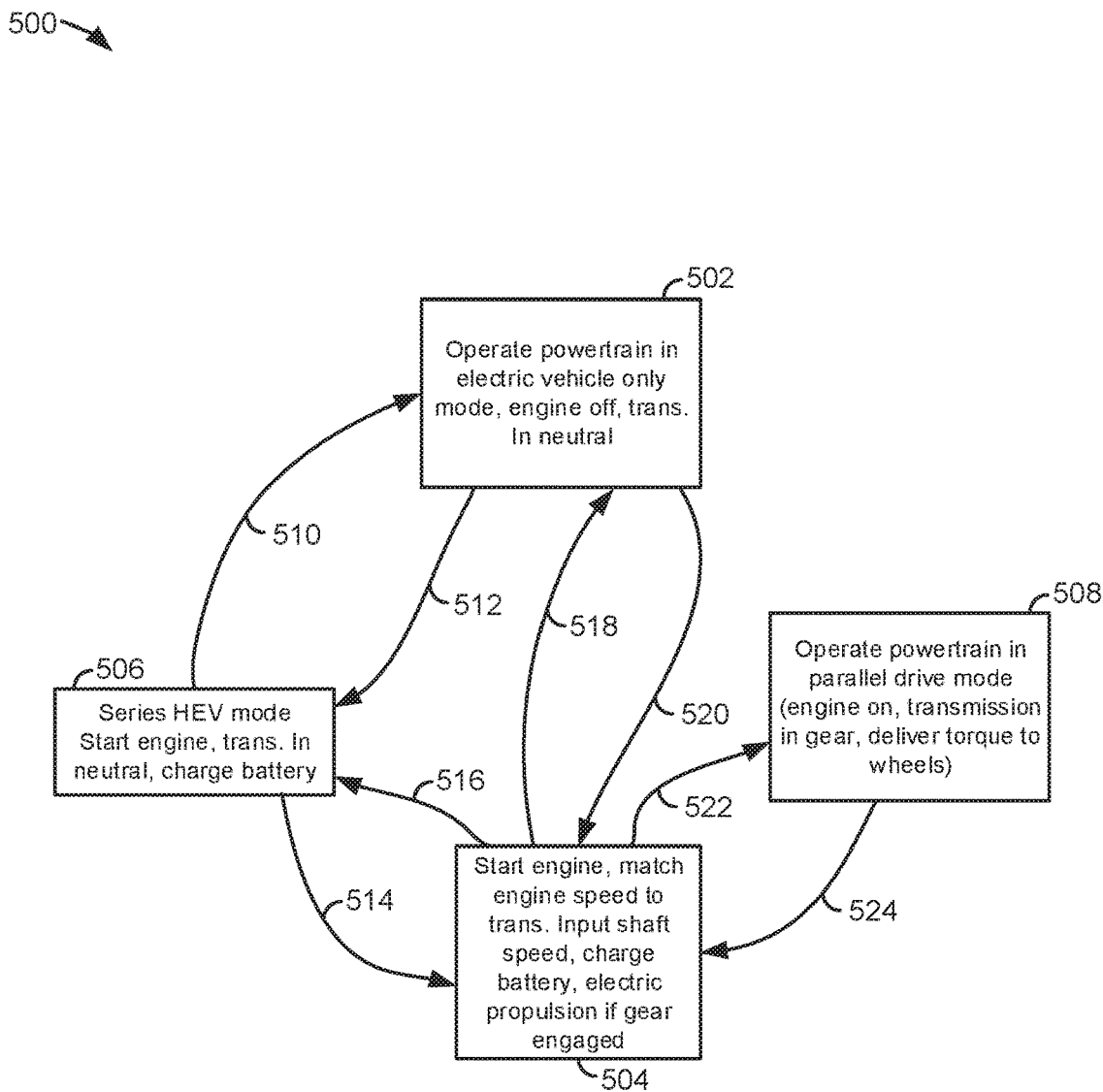
FIG. 5 shows an example state flow diagram that illustrates conditions for changing between powertrain operating modes.
Figure 6:
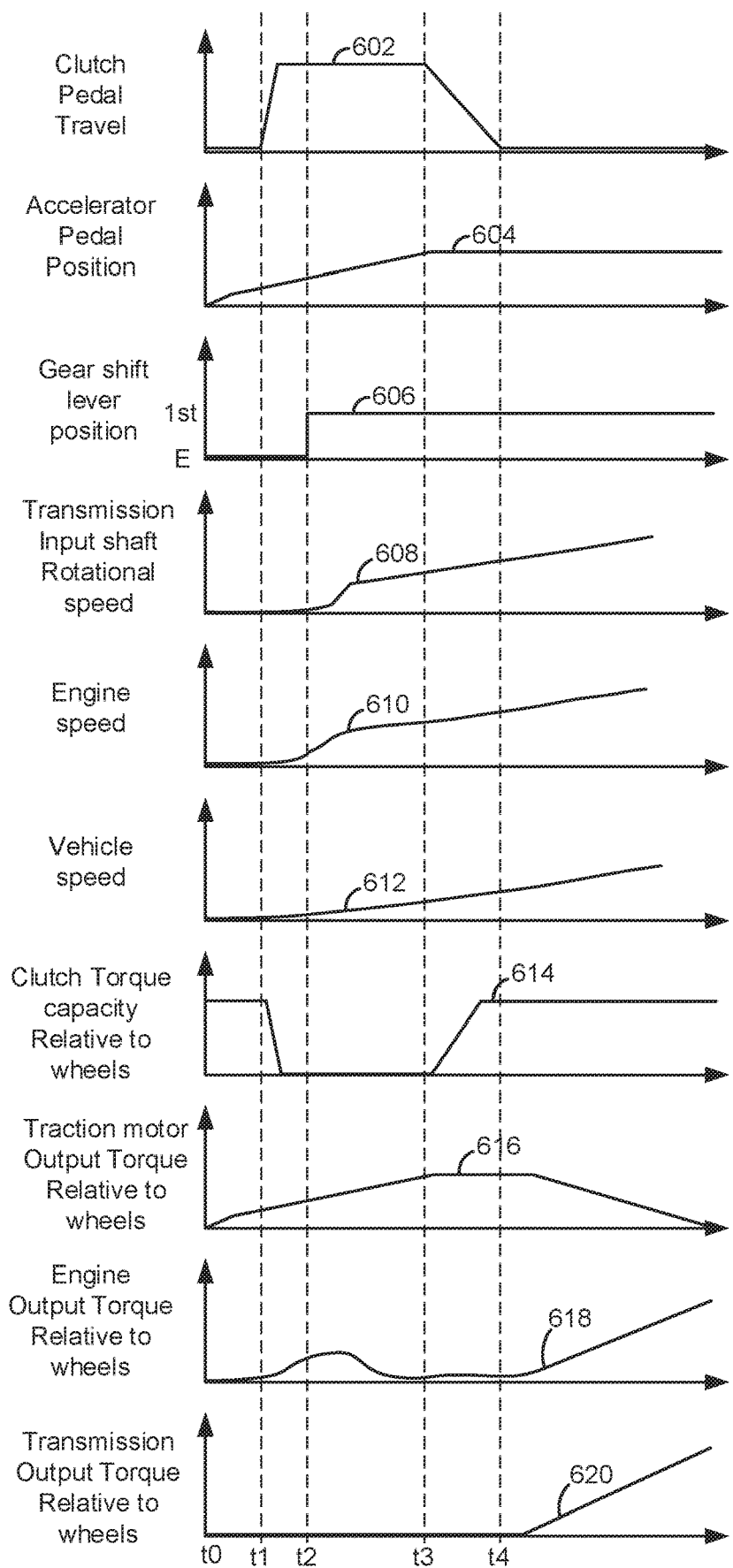
FIG. 6 shows an example of transitioning from electric vehicle only operating mode to a parallel hybrid vehicle operating mode.
Figure 7:
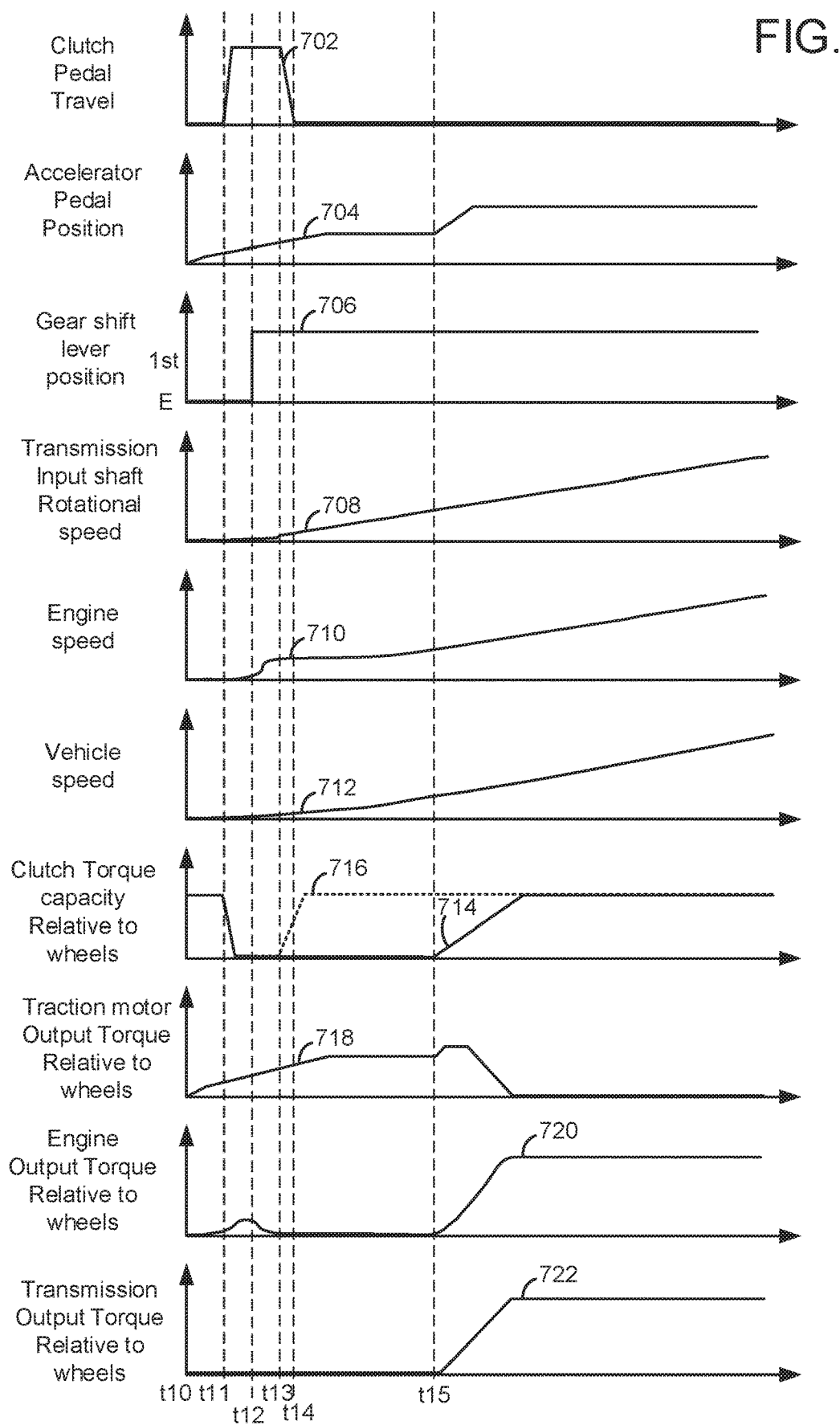
FIG. 7 shows an example of transitioning from electric vehicle only operating mode to a parallel hybrid vehicle operating mode using a electrically actuated clutch.

A hybrid vehicle with a manual transmission may include an internal combustion engine as shown in FIG. 1. The engine may be mechanically coupled to driveline configurations as shown in FIGS. 2A and 2B. FIG. 3 shows an example manual gear shifter including a lever and gear slots for the vehicles that are shown in FIGS. 2A and 2B. A method for transitioning between powertrain operating modes is shown in FIG. 4. A state flow diagram for transitioning between hybrid vehicle operating states is illustrated in FIG. 5. Hybrid vehicle powertrain mode transitioning sequences are shown in FIGS. 6 and 7.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-2B and employs the various actuators of FIGS. 1-2B to adjust engine operation based on the received signals and instructions stored on memory of controller 12. Engine 10 and the electric machines described herein that provide torque to the vehicle driveline may be referred to as driveline torque sources.

Engine 10 includes combustion chamber 30 and cylinder walls 32 with piston 36 positioned therein and connected to crankshaft 40. Flywheel 97 and ring gear 99 are coupled to crankshaft 40. Crankshaft 40 rotates and selectively provides power to vehicle wheels via a driveline. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Liquid fuel injector 66 is shown positioned to inject fuel directly into cylinder 30, which is known to those skilled in the art as direct injection. Alternatively, liquid fuel may be injected to an intake port, which is known to those skilled in the art as port injection. Fuel injector 66 deliver liquid fuel in proportion to pulse widths provided from controller 12. Fuel is delivered to fuel injector 66 by a fuel system (not shown) including a fuel tank, fuel pump, and fuel rail (not shown).

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

A human driver 132 inputs a driver demand torque to controller 12 via accelerator pedal 130 and accelerator pedal position sensor 134. The driver demand torque may be a function of vehicle speed and accelerator pedal position.

Controller 12 is shown in FIG. 1 as a conventional microcomputer including: microprocessor unit 102, input/output ports 104, non-transient memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2A is a block diagram of a vehicle powertrain 200. Powertrain 200 may be powered by engine 10 in vehicle 290. Engine 10 may be started with an engine starting system shown in FIG. 1. Further, engine 10 may generate or adjust torque via torque actuator 204, such as a fuel injector, cam, throttle, etc. Engine 10 may provide torque to alternator 202 via belt 210 to provide electrical power to electrical devices. Thus, alternator 202 selectively applies a negative torque to engine 10. Further, electrical charge is supplied by alternator 202 to electric energy storage device (e.g., low voltage battery) 291. Electric energy storage device supplies charge to ancillary electrical devices 292 (e.g., window defroster, radio, etc.). Optional belt integrated starter/generator (BISG) 220 is an electric machine that may selectively apply positive or negative torque to engine 10 via belt 222. BISG 220 may supply a positive torque to start engine 10 or to increase driveline torque when output torque of engine 10 is limited or insufficient to meet a driver demand torque.

An engine output torque may be transmitted from crankshaft 40 to manually operated clutch 206. Crankshaft 40 is directly coupled to integrated starter/generator 243. Shaft 245 may transfer torque from engine 10 and integrated starter/generator 243 to flywheel 97. Manually operated clutch 206 selectively engages flywheel 97 to transmit engine torque to transmission input shaft 270. An output side 260 of manually operated clutch 206 is directly coupled to input shaft 270 of transmission 208. An actuator 205 moves manually operated clutch plate 206a in a longitudinal direction to engage or disengage transmission input shaft 270 to the engine flywheel 97. Clutch actuator 205 may be comprised of a combination of mechanical, electrical, and hydraulic components. In one mode, a position of actuator 205 is adjusted to move proportionately with a position of clutch pedal 234 so that clutch 206 may be applied and released. A position of clutch pedal 234 is relayed to controller via sensor 232. Clutch pedal 234 is in a base position when human driver 132 is not touching clutch pedal 234. Human driver 132 applies force to move clutch pedal from its base position so that manually operated clutch 206 may be opened when clutch pedal 234 is applied. Manually operated clutch 206 may be closed when clutch pedal 234 is released.

Input shaft 270 of manually operated transmission 208 may be selectively coupled to gears (e.g., gears 1-6) 215. The gears 215 are fixed ratio gears that provide different ratios between transmission input shaft 270 and output shaft 262. Gears 215 may freely rotate about the output shaft 262 and synchronizers 216 may be utilized to lock the gears to the output shaft 262. Gears 215 may be manually engaged and disengaged by opening clutch 206 and a human driver 132 moving manual gear shift lever 217 to individually engage gears 215 via shift forks 213 and synchronizers 216. Thus, gears of manual transmission 208 are not automatically changed or changed via non-human actuators such as solenoids. Closing clutch 206 may transfer power from engine 10 to differential 263 and front wheels 282 when one of gears 215 is engaged via manual gear shifter or manual gear shift lever 217. Gear positions are reported to controller 12 via gear position sensors 275. Output shaft 262 links manual transmission 208 to wheels 218. The rotational speed of output shaft 262 may be determined via output shaft speed sensor 235.

Vehicle 290 may be activated via a human driver entering the proximity of vehicle 290 with key fob 239. Key fob 239 may transmit a unique electric signal to receiver 233 of controller 12 that identifies the human driver 132 and allows vehicle 290 to be activated. Alternatively, human driver 132 may activate vehicle 290 via human/machine interface 299 and a key switch or pushbutton.

Thus, in this example configuration, front wheels 282 may receive torque from engine 10, integrated starter/generator 243, and BISG 220 via differential 263 and axle 284. Rear wheels 281 receive torque from rear axle 286. Electric machine (traction motor) 280 may provide torque to axle 286 and rear wheels 281. High voltage electric energy storage device 255 (e.g., traction battery) may provide electrical power to and receive electrical power from inverter 253 and inverter 257. Inverter 257 transfers electrical charge between electric machine 280 and high voltage electric energy storage device 255. Inverter 253 transfers electrical charge between integrated starter/generator 243 and high voltage electric energy storage device 255. In other example configurations, front wheels 282 may instead receive torque from electric machine 280 and rear wheels 281 may receive torque from engine 10, integrated starter/generator 243, and BISG 220.

Controller 12 may be configured to receive inputs from engine 10, as shown in more detail in FIG. 1, and accordingly control a torque output of the engine and/or BISG 220, and operation of the alternator 202. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. BISG output may be controlled via supplying electrical current to BISG 220 including controlling field current of BISG 220. Controller 12 may also receive input from a driver and provide status and data to a human driver via a machine/human interface 299. The machine/human interface 299 may be a keyboard or touch screen device and a speaker for audible notification of a driver.

Referring now to FIG. 2A, a block diagram of an alternative vehicle powertrain 200 is shown. The driveline of FIG. 2B includes many of the same components described in FIG. 2A. The components of FIG. 2B that have the same numerical labels as the components that are shown in FIG. 2A are equivalent to and operate the same as those that are described in FIG. 2A. Therefore, for the sake of brevity, a description of the components shown in FIG. 2A is omitted.

In this example powertrain 200, includes an actuator 209 that moves clutch plate 206a in a longitudinal direction to engage or disengage transmission input shaft 270 to the engine flywheel 97. Clutch actuator 209 may be comprised of electrical, hydraulic, or a combination of electrical and hydraulic components. A position of clutch actuator is adjusted via controller 12 in response to a position of clutch pedal 234 and other control parameters including but not limited to engine rotational speed and transmission input shaft rotational speed. In one mode, a position of actuator 209 is adjusted via controller 12 to move proportionately with a position of clutch pedal 234 so that clutch 206 may be applied and released. A position of clutch pedal 234 is relayed to controller via sensor 232. Clutch pedal 234 is in a base position when driver 132 is not touching clutch pedal 234. Human driver 132 applies force to move clutch pedal from its base position so that clutch 206 may be opened when clutch pedal 234 is applied. Clutch 206 may be closed when clutch pedal 234 is released. Clutch actuator 209 may also open and close independent from the position of clutch pedal 234 when clutch 206 is being operated automatically. Thus, this configuration may include an electrically actuated clutch when actuator 209 is operated via electric charge.

Referring now to FIG. 3, transmission gear shifter 300 is shown. Transmission gear shifter includes a gear shift lever 217 and a plurality of channels 350 that lead to gear selector slots 302-316. A particular gear may be engaged when gear shift lever 217 is moved to occupy one of slots 302-316. Gear shift lever 217 is shown in a neutral position where none of the manual transmission's gears are engaged. The transmission may be shifted into reverse when the manual clutch is applied and gear shift lever 217 is positioned in slot R 310. Likewise, the manual transmission 208 may be shifted into a forward gear 1-6 when the manual clutch is applied and gear shift lever 217 is positioned in one of slots 304, 306, 308, 312, 314, and 316. The manual transmission 208 may be shifted into electric vehicle only mode when gear shift lever 217 is positioned in slot E 302. The manual transmission is in neutral (no engaged gears) when gear shift lever 217 is positioned in slot E 302. Of course, gearshifter 300 is only one of a plurality of gear shifter configurations that are envisioned.

Thus, the systems of FIGS. 1-3 provide for a vehicle system, comprising: an engine; a manual transmission coupled to the engine, the manual transmission including a clutch that selectively directs torque from the engine to a plurality of gears; a clutch pedal; an actuator that operates the clutch; and a controller including executable instructions stored in non-transitory memory to fully open the clutch via the actuator in response to a human applying the clutch pedal, and further instructions to fully close the clutch in response to a rotational speed of the engine and a rotational speed of an input shaft of the manual transmission after the human fully releases the clutch pedal. The vehicle system further comprises additional instruction to operate the vehicle system in an electric vehicle only mode while a gear shifter of the manual transmission is engaged in an electric vehicle only mode gear slot and the clutch pedal is released. The vehicle system includes where the electric vehicle only mode propels a vehicle via an electric machine, the electric machine coupled to a first axle. The vehicle system includes where the engine is coupled to a second axle. The vehicle system includes where the manual transmission is in neutral when the gear shifter of the manual transmission is engaged in an electric vehicle only mode gear slot. The vehicle system further comprises additional instructions to enter and exit a plurality of hybrid vehicle modes in response to a position of the clutch pedal.

Referring now to FIG. 4, a method for operating a hybrid vehicle with a manual transmission is shown. The method of FIG. 4 may be at least partially implemented as executable instructions stored in non-transitory controller memory. The method of FIG. 4 may cooperate with and be a part of the system of FIGS. 1-3. At least portions of the method of FIG. 4 may be actions taken in the physical world via controller 12 to transform operating conditions of a vehicle. Further, the method of FIG. 4 along with the system of FIGS. 1-3 may provide the sequences shown in FIGS. 6 and 7.

At 402, method 400 determines vehicle operating conditions. Vehicle operating conditions may be determined via receiving data input to a controller from vehicle sensors and actuators. Vehicle operating conditions may include but are not limited to engine speed, gear shifter selector position, clutch pedal position, transmission input shaft speed, transmission output shaft speed, vehicle speed, accelerator pedal position, clutch driver demand torque, battery state of charge (SOC), and brake pedal position. Method 400 proceeds to 404 after vehicle operating conditions are determined.

At 404, method 400 judges if the vehicle is activated. The vehicle may be activated via a human driver supplying input to a human/machine interface or via a key fob entering the proximity of the vehicle (e.g., within 10 meters). If method 400 judges that the vehicle is activated, the answer is yes and method 400 proceeds to 406. Otherwise, the answer is no and method 400 proceeds to 420.

At 420, method 400 ceases internal combustion engine operation and electric machine operation. Engine operation may be ceased by stopping fuel flow and spark to the engine. Electric machine operation may be ceased by stopping current flow to the electric machine or electric machines (e.g., 243 and 220 of FIGS. 2A and 2B). Method 400 proceeds to exit after engine and electric machine operation has ceased.

At 406, method 400 judges if the manual gear shift lever (e.g., 217 of FIGS. 2A and 2B) is in the electrical vehicle only slot or position of the gear shifter. If so, the answer is yes and method 400 proceeds to 408. Otherwise, the answer is no and method 400 proceeds to 430. Thus, method 400 may determine that the gear shift lever is in the E position and proceed to 408. Alternatively, method 400 may determine that the gear shift lever is not in the E position and proceed to 430.

At 408, method 400 judges if the clutch pedal (e.g., 234 of FIGS. 2A and 2B) is applied. If so, the answer is yes and method 400 proceeds to 440. Otherwise, the answer is no and method 400 proceeds to 410. Thus, method 400 may determine that the clutch pedal is applied and proceed to 440. Alternatively, method 400 may determine that the clutch pedal is not applied and proceed to 410.

At 410, method 400 judges if the traction battery SOC is low. If so, the answer is yes and method 400 proceeds to 412. Otherwise, the answer is no and method 400 proceeds to 450. Thus, method 400 may determine that the traction battery SOC is low and proceed to 412. Alternatively, method 400 may determine that the traction battery SOC is not low and proceed to 450.

At 412, method 400 starts the engine if the engine is not started by rotating the engine via a starter or electric machine and supplying spark and fuel to the engine. The manual transmission is in neutral since the gear shift lever 217 is in the E slot of gear shifter 300. Method 400 also charges the traction battery via engine 10 supplying torque to ISG 243. Thus, engine 10 is combusting fuel and ISG 243 converts output torque of engine 10 into electrical energy that is stored in the traction battery. An electric machine may be supplying torque to vehicle wheels while engine 10 is charging the traction battery. This mode may be referred to as series hybrid mode.

Driver demand torque may be determined from accelerator pedal position and vehicle speed. In particular, accelerator pedal position and vehicle speed may reference or index a table or function that outputs driver demand torque. The driver demand torque may be a wheel torque or an input torque to the transmission or an axle. The electric machine that is coupled to the rear axle (e.g., 280 if FIGS. 2A and 2B) may supply the driver demand torque while the engine is charging the traction battery. Thus, vehicle 290 may be propelled via an electrical torque source in the series powertrain mode. This mode may be activated when it is desired to operate the engine while the vehicle is operating in electrical vehicle only hybrid operation mode (e.g., propulsive torque is provided only via an electric machine). Thus, the vehicle may operate in series and electric vehicle only modes contemporaneously during some conditions. If driver demand torque is zero, the engine may charge the traction battery without torque being supplied to the vehicle's wheels via an electric machine. Method 400 returns to 402 after providing the desired driver demand torque and charging the traction battery in the series hybrid vehicle mode.

At 450, method 400 operates the powertrain in electric vehicle only operating mode where driver demand torque is provided to vehicle wheels only via an electric machine (e.g., 280 of FIGS. 2A and 2B). Further, the engine is not combusting fuel and it is not rotating. The manual transmission is in neutral since the gear shift lever 217 is in the E slot of gear shifter 300. Method 400 returns to 402 after providing the desired driver demand torque in the electric vehicle only hybrid vehicle drive mode.

Driver demand torque is provided to vehicle wheels only via an electric machine (e.g., 280 of FIGS. 2A and 2B) in hybrid vehicle electric only mode. Hybrid vehicle electric only mode may be activated when a driver demand torque is at a low or medium level. Thus, the powertrain may be operated in hybrid vehicle electric only mode during stop and go traffic conditions. If driver demand torque exceeds a threshold level, then the powertrain may enter parallel hybrid mode. In addition, the electric machine may provide regenerative braking when the vehicle's driver applies the brake pedal or when driveline braking is requested (brake pedal need not be applied). Friction brakes may also be applied if traction battery SOC is high or high braking torque is requested.

At 430, method 400 judges if the manual gear shift lever (e.g., 217 of FIGS. 2A and 2B) is in a gear slot or position (e.g., R or 1-6). If so, the answer is yes and method 400 proceeds to 432. Otherwise, the answer is no and method 400 proceeds to 440. Thus, method 400 may determine that the gear shifter is engaging a gear and proceed to 432. Alternatively, method 400 may determine that the gear shifter is not engaging a gear and proceed to 440.

At 432, method 400 judges if the clutch pedal (e.g., 234 of FIGS. 2A and 2B) is applied. If so, the answer is yes and method 400 proceeds to 440. Otherwise, the answer is no and method 400 proceeds to 434. Thus, method 400 may determine that the clutch pedal is applied and proceed to 440. Alternatively, method 400 may determine that the clutch pedal is not applied and proceed to 434.

In some examples, if the powertrain includes an electrical clutch actuator, the clutch may not be closed when the human driver releases the clutch pedal if release of the clutch pedal might cause an engine stall or powertrain torque disturbance. In one example, method 400 may hold the clutch open until engine rotational speed is within a threshold speed of transmission input shaft rotational speed, then the electric clutch actuator may close the clutch. In this way, the electric clutch actuator may be operated by the controller to provide smooth gear shifting and torque delivery to the vehicle's wheels.

At 434, method 400 operates the powertrain in a parallel drive mode where power may be provided to vehicle wheels via the electric machines (e.g., 243 and 220) and engine 10. Thus, engine 10 may be combusting fuel and electric machines may be consuming electrical power to provide a driver demand torque. In addition, the transmission is engaged in a gear and the clutch is closed so that the engine may deliver power to vehicle wheels. The parallel drive mode may be activated during vehicle conditions including high speed cruise, deceleration, and vehicle acceleration. In one example, driver demand torque may be allocated between the internal combustion engine and the electric machines such that the total driver demand torque is provided at the vehicle wheels. Thus, if the driver demand torque is 400 Newton-meters (N-m) at the vehicle wheels, the internal combustion engine may provide 300 N-m of torque at the vehicle wheels and electric machine 280 may provide 100 N-m of torque at the vehicle wheels. Further, driveline braking may be provided by the engine and the electric machines during parallel drive mode. Method 400 returns to 402 after providing the desired driver demand torque in the parallel hybrid vehicle mode.

At 440, method 400 starts the engine by rotating the engine via an electric machine and supplying spark and fuel to the engine. Method 400 also adjusts the speed of the engine to a speed of the transmission input shaft. In one example, the engine may be operated in a speed control mode where engine torque is adjusted to control engine speed to a desired value. Alternatively, the engine may be operated in a torque control mode and ISG 243 may be operated in a speed control mode so that engine speed and ISG speed are substantially equal (e.g., within 5%) of transmission input shaft speed. The engine and/or ISG speed are adjusted to the speed of the transmission input shaft so that if the human driver releases the clutch pedal (e.g., closes the clutch) the engine may be coupled to the vehicle's wheels without a large torque disturbance occurring in the powertrain. The ISG may be operated in a speed control mode by adjusting ISG torque such that rotational speed of the ISG is a desired speed. The desired ISG speed may be the rotational speed of the transmission input shaft.

The traction battery may also be charged at 440 and driver demand torque may be provided by or met via electric machine 280. For example, if the clutch pedal is applied and driver demand is non-zero, the driver demand wheel torque may be provided by electric machine 280 when the driver demand torque is less than a threshold torque. If driver demand torque is greater than the threshold torque, then electric machine 280 may provide a percentage of the driver demand torque so that the vehicle wheels receive positive torque even when the clutch pedal is applied so that little or no reduction in vehicle speed may be provided even though the clutch pedal is applied and the clutch is open. However, if the brake pedal is applied the driver demand torque may be reduced by the amount of the brake torque that is requested by the brake pedal so that electric machine 280 outputs a torque that is equal to the driver demand torque minus the requested braking torque. If the transmission is not in one of slots E, R, 1-6, then electric machine 280 torque may be reduced to zero. Method 400 returns to 402 after starting the engine and matching engine speed to transmission input shaft speed.

The method of FIG. 4 may be repeatedly be performed so that the powertrain may change between modes. For example, the vehicle may change the powertrain from operating in electric vehicle only mode to starting engine mode with engine speed following transmission input shaft speed followed by operating the powertrain in parallel powertrain mode. FIG. 5 shows the powertrain modes and conditions for transitioning between the modes in a state flow diagram.

Referring now to FIG. 5, a state flow diagram 500 that illustrates examples of conditions for changing between powertrain operating modes is shown. The state flow control shown in FIG. 5 may be at least partially implemented as executable instructions stored in non-transitory controller memory. The state flow control of FIG. 5 may cooperate with and be a part of the system of FIGS. 1-3. At least portions of the state control of FIG. 5 may be actions taken in the physical world via controller 12 to transform operating conditions of a vehicle. Further, the state control of FIG. 5 along with the system of FIGS. 1-3 may provide the sequences shown in FIGS. 6 and 7.

Block 502 represents electric vehicle only operating mode or state where torque is delivered to vehicle wheels only via an electric torque source (e.g., electric machine 280). The engine may be off (not combusting fuel) and the transmission in neutral when the powertrain is operated in electric vehicle only operating mode.

Block 504 represents parallel hybrid vehicle operating mode or state where torque is delivered to vehicle wheels via the internal combustion engine 10 and an electric torque source (e.g., electric machine 280). The engine is combusting fuel and the transmission is engaged in a gear with the clutch closed. The traction battery may be charged and driver demand torque may be provided to the vehicle's wheels via engine 10, electric machine 220, electric machine 243, and electric machine 280.

Block 506 represents series hybrid vehicle operating mode or state where torque is delivered to vehicle wheels only via an electric torque source (e.g., electric machine 280) and engine 10 is combusting fuel and charging the traction battery via electric machine 243 and/or electric machine 220. The manual transmission is in neutral.

Block 508 represents engine starting state and engine speed control mode where engine rotational speed is controlled to a rotational speed of the transmission input shaft. In one example, speed of the transmission input shaft is estimated by multiplying the rotational speed of the transmission output shaft by the ratio of the presently engage manual transmission gear. The engine torque of torque of an electric machine (e.g., 243 or 220) is adjusted so that engine speed follows and is equal to speed of the transmission input shaft. By adjusting engine rotational speed to the rotational speed of the transmission input shaft, the clutch may be closed without hesitation to deliver engine torque smoothly to the driveline if parallel hybrid powertrain mode is requested. Additionally, the traction battery may be charged in this powertrain operating state.

Arrows 510-524 represent conditions for transitioning or moving between the various powertrain operating state. Arrow 512 indicates that if traction battery SOC falls to less than a first threshold when the powertrain is in electric vehicle only mode at 502, then the powertrain may move from electric vehicle only mode at 502 to series mode at 506. Arrow 510 indicates that if traction battery SOC is greater than a second threshold when the powertrain is in series mode at 506, then the powertrain may move from series mode at 506 to electric vehicle only mode at 502. Arrow 514 indicates that if the clutch pedal is applied or depressed when the powertrain is in series hybrid vehicle only mode at 506, then the powertrain may move from series hybrid vehicle mode at 506 to starting engine and engine following transmission input shaft rotational speed mode at 504. Arrow 516 indicates that if the powertrain is in engine starting and engine speed tracking transmission input shaft rotational speed mode at 504, then the powertrain may move from engine speed tracking transmission input shaft rotational speed mode at 504 to series hybrid vehicle mode at 506. Arrow 520 indicates that if clutch pedal is applied when the powertrain is in electric vehicle only mode at 502, then the powertrain may move from electric vehicle only mode at 502 to engine starting and engine speed tracking transmission input shaft rotational speed mode at 504. Arrow 518 indicates that if the clutch pedal is released and the gear shifter is in the electric drive position or slot E while traction battery SOC is greater than a threshold when the powertrain is in engine starting and engine speed tracking transmission input shaft rotational speed mode at 504, then the powertrain may move from engine starting and engine speed tracking transmission input shaft rotational speed mode at 504 to electric vehicle only mode at 502. Arrow 522 indicates that if the clutch pedal is released and the gear shift lever is not in the electric drive position or slot E when the powertrain is in engine starting and engine speed tracking transmission input shaft rotational speed mode at 504, then the powertrain may move from engine starting and engine speed tracking transmission input shaft rotational speed mode at 504 to parallel mode at 508. Arrow 524 indicates that if clutch pedal is applied and the powertrain is in parallel mode at 508, then the powertrain may move from parallel mode at 508 to engine starting and engine speed tracking transmission input shaft rotational speed mode at 504.

Thus, the methods described herein provide for a method for operating a vehicle, comprising: operating a powertrain in an electric vehicle only drive mode; and starting combustion in an engine and adjusting engine speed to a speed of a transmission input shaft to exit the electric vehicle only drive mode in response to a human driver manually disengaging a clutch via a clutch pedal. The method includes where the engine is started via an integrated starter/generator, where an electric machine coupled to a first axle propels the vehicle in the electric vehicle only drive mode, and where the engine and the integrated starter/generator are selectively coupled to a second axle. The method further comprises operating the integrated starter/generator in a speed control mode to adjust engine speed to the speed of the transmission input shaft. The method further comprises operating the powertrain in a parallel hybrid vehicle mode in response to a human driver releasing the clutch pedal. The method includes where operating the powertrain in an electric vehicle only drive mode requires a gear shift lever positioned in an electric vehicle drive mode gear slot by a human driver.

In some examples, the method further comprises exiting the electric vehicle only drive mode and entering a series hybrid vehicle drive mode in response to a battery state of charge being less than a first threshold, where the series hybrid vehicle drive mode includes combusting fuel in an engine and supplying electric charge from a first electric machine (e.g., 243) to a second electric machine (e.g., 280), the first electric machine rotated via the engine. The method further comprises entering the electric vehicle only drive mode from the series hybrid vehicle drive mode in response to the battery state of charge being greater than a second threshold while a gear shift lever is positioned in an electric vehicle drive mode gear slot. The method further comprises ceasing combustion in the engine in response to the human driver releasing the clutch while a gear shift lever is positioned in and electric vehicle drive mode gear slot.

The methods described herein also provide for a method for operating a vehicle, comprising: operating a powertrain in a parallel hybrid vehicle drive mode; and exiting the parallel hybrid vehicle drive mode and adjusting a rotational speed of an engine to a rotational speed of a transmission input shaft in response to a human driver manually disengaging a clutch via a clutch pedal. The method further comprises supplying a requested driver demand torque to vehicle wheels via an electric machine while the clutch is disengaged. The method includes where the engine is operated in a speed control mode while the clutch is disengaged. The method includes where an electric machine that is coupled to the engine is operated in a speed control mode while the clutch is disengaged. The method further comprises charging a battery via the engine while the clutch is disengaged. The method further comprises entering an electric vehicle only drive mode in further response to engaging a gear shifter in an electric vehicle only mode gear slot and engaging the clutch.

Referring now to FIG. 6, an example sequence is shown of a powertrain transitioning from electric vehicle only mode to parallel hybrid vehicle mode. The sequence of FIG. 6 may be performed via the method of FIG. 4 in cooperation with the system of FIGS. 1-3.

The first plot from the top of FIG. 6 is a plot of clutch pedal travel or position versus time. The vertical axis represents clutch pedal travel and the clutch pedal is fully applied (e.g., fully open) when trace 602 is near the vertical axis arrow. The clutch pedal is fully released when trace 602 is near the horizontal axis. Trace 602 represents clutch pedal travel. The horizontal axis represents time and time increases from the left side of the figure to the right side of the figure.

The second plot from the top of FIG. 6 is a plot of accelerator pedal position versus time. The vertical axis represents accelerator pedal position and accelerator pedal is fully applied when trace 604 is near the vertical axis arrow. Trace 604 represents accelerator pedal position. The horizontal axis represents time and time increases from the left side of the figure to the right side of the figure.

The third plot from the top of FIG. 6 is a plot of gear shift lever position or slot versus time. The vertical axis represents the gear shift lever position or slot. Trace 606 represents gear shift lever position. The horizontal axis represents time and time increases from the left side of the figure to the right side of the figure.

The fourth plot from the top of FIG. 6 is a plot of transmission input shaft rotational speed versus time. The vertical axis represents transmission input shaft rotational speed and transmission input shaft rotational speed increases in the direction of the vertical axis arrow. Trace 608 represents transmission input shaft rotational speed. The horizontal axis represents time and time increases from the left side of the figure to the right side of the figure.

The fifth plot from the top of FIG. 6 is a plot of engine rotational speed versus time. The vertical axis represents engine rotational speed and engine rotational speed increases in the direction of the vertical axis arrow. Trace 610 represents engine crankshaft rotational speed. The horizontal axis represents time and time increases from the left side of the figure to the right side of the figure.

The sixth plot from the top of FIG. 6 is a plot of vehicle speed versus time. The vertical axis represents vehicle speed and vehicle speed increases in the direction of the vertical axis arrow. Trace 612 represents vehicle speed. The horizontal axis represents time and time increases from the left side of the figure to the right side of the figure.

The seventh plot from the top of FIG. 6 is a plot of clutch torque capacity (e.g. an amount of torque the clutch may transfer when a particular clutch closing force is applied to the clutch) relative to vehicle wheels versus time. The vertical axis represents clutch torque capacity relative to vehicle wheels and clutch torque capacity relative to vehicle wheels increases in the direction of the vertical axis arrow. Trace 614 represents clutch torque capacity relative to vehicle wheels. The horizontal axis represents time and time increases from the left side of the figure to the right side of the figure.

The eighth plot from the top of FIG. 6 is a plot of traction motor output torque relative to vehicle wheels versus time. The vertical axis represents traction motor output torque relative to vehicle wheels and traction motor output torque relative to vehicle wheels increases in the direction of the vertical axis arrow. Trace 616 represents traction motor output torque relative to vehicle wheels. The horizontal axis represents time and time increases from the left side of the figure to the right side of the figure.

The ninth plot from the top of FIG. 6 is a plot of engine output torque relative to vehicle wheels versus time. The vertical axis represents engine output torque relative to vehicle wheels and engine output torque relative to vehicle wheels increases in the direction of the vertical axis arrow. Trace 618 represents engine output torque relative to vehicle wheels. The horizontal axis represents time and time increases from the left side of the figure to the right side of the figure.

The tenth plot from the top of FIG. 6 is a plot of transmission output torque relative to vehicle wheels versus time. The vertical axis represents transmission output torque relative to vehicle wheels and transmission output torque relative to vehicle wheels increases in the direction of the vertical axis arrow. Trace 620 represents transmission output torque relative to vehicle wheels. The horizontal axis represents time and time increases from the left side of the figure to the right side of the figure.

At time t0, the clutch pedal is not applied and the accelerator pedal is applied a small amount. The transmission gear shift lever is in the electric vehicle only powertrain mode slot and the transmission input shaft rotational speed is zero. The engine speed is also zero and the vehicle speed is zero. The clutch torque capacity is high and the traction motor output torque is a small amount. The engine output torque relative to the wheels is zero and the transmission output torque relative to the wheels is zero.

At time t1, a human driver (not shown) applies the clutch pedal and the applied clutch pedal initiates an engine start. The accelerator pedal position has increased by a small amount since time to and the gear shift lever remains in the E position. The transmission input shaft speed is zero and the engine speed begins to increase as the engine is cranked. The vehicle speed continues to increase and the clutch torque capacity begins to decline. The traction motor output continues to increase as the accelerator pedal position increases and engine torque begins to increase. Only the traction motor delivers the driver demand torque to the vehicle wheels. The transmission output torque is zero.

At time t2, the human driver has fully applied the clutch pedal and engages first gear by moving the gear shift lever position. The accelerator pedal position continues to increase and the transmission input shaft speed begins to increase since the gear shift lever causes the transmission input shaft to be locked to the transmission output shaft and the transmission output shaft rotates with vehicle movement. The engine speed continues to increase as combustion occurs within the engine. The vehicle speed continues to increase and the clutch torque capacity is zero. The traction motor output continues to increase with the increasing accelerator pedal position. Only the traction motor delivers the driver demand torque to the vehicle wheels. The engine torque output increases as the engine starts and the transmission output torque is zero.

At time t3, the driver begins to release the clutch pedal and the clutch torque capacity begins to increase as the clutch pedal begins to be released. The human driver (not shown) continues to increase the accelerator pedal position and the gear shift lever remains in $1^{st}$ gear position. The transmission input shaft rotational speed continues to increase and engine speed continues to increase. The vehicle speed also continues to increase and the traction motor output torque continues to increase in response to the accelerator pedal position increasing. The engine output torque is low and the transmission output torque is low.

At time t4, the clutch pedal is fully released and the clutch torque capacity has reached its maximum value. The accelerator pedal position has leveled off at a constant value and the gear shift lever remains in first gear position. The transmission input shaft rotational speed continues to increase as engine torque is delivered to the vehicle's wheels. The traction motor torque has leveled off to a constant value and the engine output torque is beginning to increase along with the transmission output torque.

Thus, the driveline may be transitioned from an electric vehicle only mode where a traction motor is solely providing torque to vehicle wheels to a parallel hybrid mode where an internal combustion engine and the traction motor are supplying torque to the vehicle's wheels. The transition may be initiated by a human driver applying a clutch pedal and moving a gear shift lever to a position of a gear. The engine speed is accelerated to a rotational speed of a transmission input shaft so that torque transfer through the clutch may be smooth when the human driver releases the clutch.

Referring now to FIG. 7, an example sequence is shown of a powertrain transitioning from electric vehicle only mode to parallel hybrid vehicle mode. The sequence of FIG. 6 may be performed via the method of FIG. 4 in cooperation with the system of FIGS. 1-3. In this example, the powertrain includes an electrically operated clutch as is discussed in the description of FIG. 2B.

The first plot from the top of FIG. 7 is a plot of clutch pedal travel or position versus time. The vertical axis represents clutch pedal travel and the clutch pedal is fully applied (e.g., fully open) when trace 702 is near the vertical axis arrow. The clutch pedal is fully released when trace 702 is near the horizontal axis. Trace 702 represents clutch pedal travel. The horizontal axis represents time and time increases from the left side of the figure to the right side of the figure.

The second plot from the top of FIG. 7 is a plot of accelerator pedal position versus time. The vertical axis represents accelerator pedal position and accelerator pedal is fully applied when trace 704 is near the vertical axis arrow. Trace 704 represents accelerator pedal position. The horizontal axis represents time and time increases from the left side of the figure to the right side of the figure.

The third plot from the top of FIG. 7 is a plot of gear shift lever position or the slot that is engaged by the gear shift lever versus time. The vertical axis represents the gear shift lever position or slot. Trace 706 represents gear shift lever position. The horizontal axis represents time and time increases from the left side of the figure to the right side of the figure.

The fourth plot from the top of FIG. 7 is a plot of transmission input shaft rotational speed versus time. The vertical axis represents transmission input shaft rotational speed and transmission input shaft rotational speed increases in the direction of the vertical axis arrow. Trace 708 represents transmission input shaft rotational speed. The horizontal axis represents time and time increases from the left side of the figure to the right side of the figure.

The fifth plot from the top of FIG. 7 is a plot of engine rotational speed versus time. The vertical axis represents engine rotational speed and engine rotational speed increases in the direction of the vertical axis arrow. Trace 710 represents engine crankshaft rotational speed. The horizontal axis represents time and time increases from the left side of the figure to the right side of the figure.

The sixth plot from the top of FIG. 7 is a plot of vehicle speed versus time. The vertical axis represents vehicle speed and vehicle speed increases in the direction of the vertical axis arrow. Trace 712 represents vehicle speed. The horizontal axis represents time and time increases from the left side of the figure to the right side of the figure.

The seventh plot from the top of FIG. 7 is a plot of clutch torque capacity (e.g. an amount of torque the clutch may transfer when a particular clutch closing force is applied to the clutch) relative to vehicle wheels versus time. The vertical axis represents clutch torque capacity relative to vehicle wheels and clutch torque capacity relative to vehicle wheels increases in the direction of the vertical axis arrow. Solid trace 714 represents actual clutch torque capacity relative to vehicle wheels as controlled via the electrically operated clutch. Dashed trace 716 represents human driver clutch torque capacity relative to vehicle wheels as controlled via the human driver (not shown). Dashed trace 716 is at a same level as solid trace 714 when only solid trace 714 is visible. The horizontal axis represents time and time increases from the left side of the figure to the right side of the figure.

The eighth plot from the top of FIG. 7 is a plot of traction motor output torque relative to vehicle wheels versus time. The vertical axis represents traction motor output torque relative to vehicle wheels and traction motor output torque relative to vehicle wheels increases in the direction of the vertical axis arrow. Trace 718 represents traction motor output torque relative to vehicle wheels. The horizontal axis represents time and time increases from the left side of the figure to the right side of the figure.

The ninth plot from the top of FIG. 7 is a plot of engine output torque relative to vehicle wheels versus time. The vertical axis represents engine output torque relative to vehicle wheels and engine output torque relative to vehicle wheels increases in the direction of the vertical axis arrow. Trace 720 represents engine output torque relative to vehicle wheels. The horizontal axis represents time and time increases from the left side of the figure to the right side of the figure.

The tenth plot from the top of FIG. 7 is a plot of transmission output torque relative to vehicle wheels versus time. The vertical axis represents transmission output torque relative to vehicle wheels and transmission output torque relative to vehicle wheels increases in the direction of the vertical axis arrow. Trace 722 represents transmission output torque relative to vehicle wheels. The horizontal axis represents time and time increases from the left side of the figure to the right side of the figure.

At time t10, the clutch pedal is not applied and the accelerator pedal is applied a small amount. The transmission gear shift lever is in the electric vehicle only slot and the transmission input shaft rotational speed is zero. The engine speed is also zero and the vehicle speed is zero. The driver requested and actual clutch torque capacities are high and the traction motor output torque is a small amount and it is delivered to the vehicle's rear wheels. Only the traction motor delivers the driver demand torque to the vehicle wheels. The engine output torque relative to the wheels is zero and the transmission output torque relative to the wheels is zero.

At time t11, a human driver (not shown) applies the clutch pedal and the applied clutch pedal initiates an engine start. The electric clutch actuator follows the human driver's clutch pedal by adjusting clutch capacity responsive to the clutch pedal position. The accelerator pedal position has increased by a small amount since time t10 and the gear shift lever remains in the E position. The transmission input shaft speed is zero and the engine speed begins to increase as the engine is cranked. The vehicle speed has increased and the actual and driver requested clutch torque capacities begin to decline. The traction motor output continues to increase as the accelerator pedal position increases and engine torque begins to increase. Only the traction motor delivers the driver demand torque to the vehicle wheels. The transmission output torque is zero.

At time t12, the human driver has fully applied the clutch pedal and engages first gear by moving the gear shift lever position. The electric clutch actuator continues to follow the human driver's clutch pedal by adjusting clutch capacity responsive to the clutch pedal position. The accelerator pedal position continues to increase and the transmission input shaft speed begins to increase since the gear shift lever causes the transmission input shaft to be locked to the transmission output shaft and the transmission output shaft rotates with vehicle movement. The engine speed continues to increase as combustion occurs within the engine. The vehicle speed continues to increase and the actual and driver requested clutch torque capacities are zero. The traction motor output continues to increase with the increasing accelerator pedal position. Only the traction motor delivers the driver demand torque to the vehicle wheels. The engine torque output increases as the engine starts and the transmission output torque is zero.

At time t13, the driver begins to release the clutch pedal and the driver request clutch torque capacity begins to increase as the clutch pedal begins to be released. However, because vehicle speed is low and because engine rotational speed is greater than transmission input shaft rotational speed, the actual clutch torque capacity remains zero by the clutch actuator not releasing the clutch from a fully open state. The electric clutch actuator does not follow the human driver's clutch pedal by adjusting clutch capacity responsive to the clutch pedal position so that powertrain torque disturbances may be reduced. The human driver (not shown) continues to increase the accelerator pedal position and the gear shift lever remains in $1^{st}$ gear position. The transmission input shaft rotational speed continues to increase and engine speed continues to increase. The vehicle speed also continues to increase and the traction motor output torque continues to increase in response to the accelerator pedal position increasing. The engine output torque is low and the transmission output torque is zero.

At time t14, the clutch pedal is fully released and the driver requested clutch torque capacity has reached its maximum value. The actual clutch torque capacity remains zero and the clutch does not transfer torque. The accelerator pedal position continues to increase and then levels off at a constant value after time t14. The gear shift lever remains in first gear position. The transmission input shaft rotational speed continues to increase as the vehicle speed increases since the transmission input shaft is locked to the transmission output shaft and wheels via the synchronizer being engaged with first gear. Engine torque remains at a low value and the traction motor torque provides the torque that is requested via the accelerator pedal. The transmission output torque remains at zero.

At time t15, the accelerator pedal position increases while the clutch pedal is released. The traction motor torque output is increased in response to the increase in the accelerator pedal position, but the traction motor is running out of torque capacity to meet the demand from the accelerator pedal. Therefore, the actual clutch torque capacity is increased by the electric clutch actuator beginning to close the clutch. The engine output torque also begins to increase to meet the demand provided by the accelerator pedal. The transmission output torque increases as the engine torque increases and as the actual torque capacity of the clutch increases. The vehicle speed continues to increase and the transmission remains in first gear. Shortly after time t15, the actual clutch torque capacity has reached its maximum level as the electric clutch actuator fully closes the clutch. The engine output torque is also increased and the traction motor torque output is decreased as torque from the motor is delivered to the vehicle's wheels. If the clutch had actually been fully released at time t14 as instructed by the human driver, the engine may have stalled or a large driveline torque disturbance may have resulted.

Thus, a human driver may open a manually operated clutch and an electric clutch actuator may follow the input provided by the clutch pedal. However, if the clutch pedal is released early, the electric clutch actuator may delay releasing the clutch to improve powertrain torque delivery smoothness. Consequently, powertrain operation may be smooth even with less experienced vehicle operators.

As will be appreciated by one of ordinary skill in the art, method described herein may represent one or more of any number of processing strategies such as event-driven, interrupt-driven, multi-tasking, multi-threading, and the like. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
    operating a powertrain in an electric vehicle only drive mode; and
    starting combustion in an engine and adjusting engine speed to a speed of a transmission input shaft to exit the electric vehicle only drive mode in response to a human driver manually disengaging a clutch via a clutch pedal.

2. The method of claim 1, where the engine is started via an integrated starter/generator, where an electric machine coupled to a first axle propels the vehicle in the electric vehicle only drive mode, and where the engine and the integrated starter/generator are selectively coupled to a second axle.

3. The method of claim 2, further comprising operating the integrated starter/generator in a speed control mode to adjust engine speed to the speed of the transmission input shaft.

4. The method of claim 1, further comprising operating the powertrain in a parallel hybrid vehicle mode in response to a human driver releasing the clutch pedal.

5. The method of claim 1, where operating the powertrain in an electric vehicle only drive mode requires a gear shift lever positioned in an electric vehicle drive mode gear slot by a human driver.

6. The method of claim 1, further comprising exiting the electric vehicle only drive mode and entering a series hybrid vehicle drive mode in response to a battery state of charge being less than a first threshold, where the series hybrid vehicle drive mode includes combusting fuel in an engine and supplying electric charge from a first electric machine to a second electric machine, the first electric machine rotated via the engine.

7. The method of claim 6, further comprising entering the electric vehicle only drive mode from the series hybrid vehicle drive mode in response to the battery state of charge being greater than a second threshold while a gear shift lever is positioned in an electric vehicle drive mode gear slot.

8. The method of claim 1, further comprising ceasing combustion in the engine in response to the human driver releasing the clutch while a gear shift lever is positioned in and electric vehicle drive mode gear slot.

9. A method for operating a vehicle, comprising:
operating a powertrain in a parallel hybrid vehicle drive mode;
exiting the parallel hybrid vehicle drive mode and adjusting a rotational speed of an engine to a rotational speed of a transmission input shaft in response to a human driver manually disengaging a clutch via a clutch pedal; and
entering an electric vehicle only drive mode in further response to engaging a gear shifter in an electric vehicle only mode gear slot and engaging the clutch.

10. The method of claim 9, further comprising supplying a requested driver demand torque to vehicle wheels via an electric machine while the clutch is disengaged.

11. The method of claim 9, where the engine is operated in a speed control mode while the clutch is disengaged.

12. The method of claim 9, where an electric machine that is coupled to the engine is operated in a speed control mode while the clutch is disengaged.

13. The method of claim 9, further comprising charging a battery via the engine while the clutch is disengaged.

14. A vehicle system, comprising:
an engine;
a manual transmission coupled to the engine, the manual transmission including a clutch that selectively directs torque from the engine to a plurality of gears;
a clutch pedal;
an actuator that operates the clutch; and
a controller including executable instructions stored in non-transitory memory to fully open the clutch via the actuator in response to a human applying the clutch pedal, and further instructions to fully close the clutch in response to a rotational speed of the engine and a rotational speed of an input shaft of the manual transmission after the human fully releases the clutch pedal, and additional instruction to operate the vehicle system in an electric vehicle only mode while a gear shifter of the manual transmission is engaged in an electric vehicle only mode gear slot and the clutch pedal is released.

15. The vehicle system of claim 14, where the electric vehicle only mode propels a vehicle via an electric machine, the electric machine coupled to a first axle.

16. The vehicle system of claim 15, where the engine is coupled to a second axle.

17. The vehicle system of claim 16, where the manual transmission is in neutral when the gear shifter of the manual transmission is engaged in the electric vehicle only mode gear slot.

18. The vehicle system of claim 14, further comprising additional instructions to enter and exit a plurality of hybrid vehicle modes in response to a position of the clutch pedal.

* * * * *